May 30, 1939.  I. J. FEDJE  2,160,329
POTATO RICER AND PRESS FOR FRUITS AND VEGETABLES
Filed Dec. 9, 1937
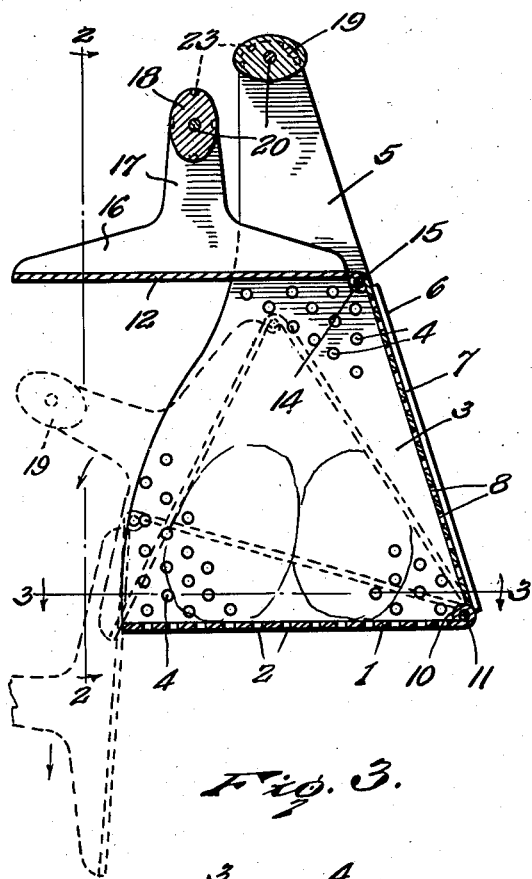
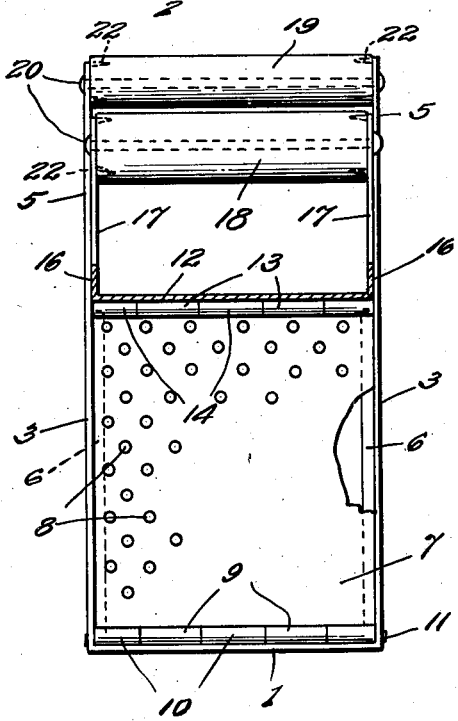
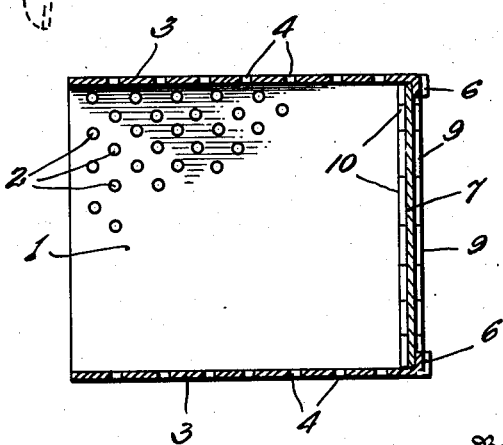
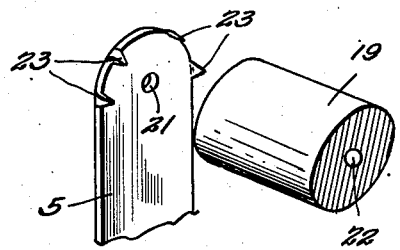
Inventor
Ida J. Fedje.
By Lacy & Lacy, Attorneys Patented May 30, 1939

2,160,329

UNITED STATES PATENT OFFICE 2,160,329

POTATO RICER AND PRESS FOR FRUITS AND VEGETABLES

Ida J. Fedje, Berwick, N. Dak.

Application December 9, 1937, Serial No. 178,992

6 Claims. (Cl. 146—176)

This invention relates to a potato ricer and fruit press, and one object of the invention is to provide a device of this character having an improved arrangement of body portion and pressure-applying elements which permit the device to be held with one hand and operated as a scoop during a filling operation.

Another object of the invention is to so construct the body portion of the device that the rear wall thereof to which the upper end of the cover is pivotally mounted will itself be pivotally mounted at its lower end for swinging movement relative to the rest of the body and thus permit this rear wall to cooperate with the cover and the bottom of the body to provide jaws between which material scooped into the body will be confined and very easily crushed and forced outwardly through perforations in the walls and bottom of the body.

It is another object of the invention to so mount the cover and the rear wall of the body to which it is pivoted that during a pressure-applying operation the plate or cover may be disposed in closing relation to the open front of the body and thus prevent contents of the body from escaping as the cover is shifted downwardly and the rear wall swung towards the bottom in a pressure-applying direction.

Another object of the invention is to provide a device of this character so constructed that after the body has been filled with material the body may be very firmly held in one hand and the plate or cover then grasped by its handle with the other hand and easily shifted downwardly across the front edge of the bottom of the body to cause the material to be squeezed out through the openings in the body by pressure exerted by the rear wall.

The invention is illustrated in the accompanying drawing, wherein

Figure 1 is a sectional view taken vertically through the improved potato ricer and fruit press, Figure 2 is a view taken along the line 2—2 of Figure 1, Figure 3 is a sectional view taken along the line 3—3 of Figure 1, and Figure 4 is a perspective view illustrating the manner in which the handle for the body is secured at the upper ends of arms rising from side walls of the body.

The body of this improved potato ricer and fruit press has a bottom 1 formed with perforations 2 and side walls 3 which are also perforated, as shown at 4, and from an inspection of Figure 2, it will be seen that the bottom and side walls are formed from a single metallic blank which has its end portions tapered to provide the side walls with upwardly extending arms 5 and is bent transversely at points spaced from each other longitudinally of the blank to provide the bottom wall and the side walls. Along their rear edges the side walls are formed with integral extensions which are bent inwardly to provide flanges 6 constituting means for limiting rearward swinging movement of a rear wall 7 which is also formed of sheet metal perforated, as shown at 8. Companion hinge ears or sleeves 9 and 10 are formed along meeting edges of the bottom 1 and rear wall 7 to receive a pin 11. It will thus be seen that the rear wall will be pivotally mounted at its lower end and may have swinging movement from a position in which it bears against the flanges 6 toward the open front end of the body, as indicated by dotted lines in Figure 1.

A cover 12 which is also formed of sheet metal but unperforated fits between the side walls of the body and at its rear end is formed with hinge ears or sleeves 13 fitting between the hinge ears 14 at the upper end of the rear wall 7 so that a pin 15 may be passed through these ears to pivotally mount the cover. By having the cover hingedly connected with the upper end of the rear wall it may be swung downwardly from a raised or opened position to a lowered position for closing the front of the body and have its lower end extend across the front end of the bottom. After the body has been half filled with material and the cover swung downwardly to a closed position, movement of the cover in this direction will be continued, as indicated by the dotted lines in Figure 1, and material confined in the body between its bottom and the descending rear wall will be crushed and squeezed outwardly through the openings in the body. The rear wall and the bottom thus constitute companion jaws between which the potatoes or fruit will be confined by the cover and crushed and then forced outwardly through the perforations of the rear wall and the bottom and side walls of the body. The cover is formed from a blank of sheet metal bent in spaced relation to its ends to provide flanges 16 which extend upwardly along side edges of the cover, as shown in Figures 1 and 2, and carry upwardly extending arms 17.

Handles 18 and 19 are provided for the cover and the body. These handles are elliptical in cross section, as shown in Figures 1 and 4, but the handles are so disposed when set in place that the greatest diameter of the handle 18 extends vertically while the greatest diameter of the handle 19 extends horizontally. Elongated pins 20 are passed through openings 21 in the arms and through bores 22 of the handles to firmly secure the arms against ends of the handles, and in order to prevent the handles from turning about the pins out of their proper positions, there have been provided spurs 23 which are formed integral with upper end portions of the arms and disposed in such positions about the screw-receiving openings 21 that they may be forced into ends of the handles where they will very effectively prevent turning of the handles.

When this improved potato ricer and fruit press is in use, the cover is swung upwardly to the opened position shown in full lines in Figure 1, and from an inspection of this figure and also Figure 2, it will be readily seen that the two handles 18 and 19 will be close to each other and may be grasped with one hand. The body may then be used as a scoop for removing potatoes or fruit from a kettle. After sufficient material to half fill the body has been scooped into the same, the handle of the cover will be released and grasped by the other hand so that the cover may be swung downwardly to a position in which it closes the front of the body and its lower portion extends across the front edge of the bottom of the body. In doing so the rear wall will be swung forwardly, as indicated by dotted lines in Figure 1. The body will then be held by the handle 19 with one hand and the handle 18 of the cover held by the other hand and pressure exerted to shift the cover downwardly and force the rear wall towards the bottom of the body so that the material confined between the bottom and the rear wall will be crushed and the crushed material forced outwardly through the perforations in the bottom and side and rear walls of the body. When the rear wall 7 has been forced downwardly as far as possible and no more material passes out through the perforations in the walls and bottom of the body, the cover will be shifted upwardly to the opened position and return the rear wall to the raised position in which it rests against the flanges 6 of the side walls. The body can then be again filled and the cover swung downwardly to a closed position and the rear wall shifted towards the bottom to force the material through the perforations of the body. Material adhering to outer surfaces of the walls and bottom can be easily scraped off as these surfaces are flat. If it is found that seed or other matter which cannot pass through the perforations have accumulated in the body against the walls or bottom thereof when the cover is swung upwardly to the opened position, this will be removed by a spoon or knife or merely by holding the device under a spigot and then turning on the water.

Having thus described the invention, what is claimed as new is:

1. A device of the character described comprising a body open at its front and having a bottom and side walls of perforated material, a rear wall of perforated material pivoted at its lower end for swinging movement between the side walls, a closure for the open front of the body pivoted at its upper end to the upper end of the rear wall for swinging movement towards and away from the same between the side walls of the body, and an operating handle carried by the closure.

2. In a device of the character described, a body open at its front and having its bottom and side and rear walls perforated, the rear wall being pivoted at its lower end, a handle for said body, a cover pivoted to the top of the rear wall and movable from a raised position out of closing relation to the front of the housing to a lowered closed position in which its lower end extends downwardly across the front edge of the bottom and the rear wall is swung forwardly and downwardly for exerting pressure upon the contents of the housing, and a handle for said cover disposed adjacent the handle of the body when the cover is in the raised position whereby the cover may be maintained in its raised position and material scooped into the body through the open front thereof.

3. A device of the character described comprising a body open at its top and front and having a bottom and side walls and a rear wall pivoted at its lower end between the side walls, the side walls extending upwardly above the rear wall, a handle secured transversely between upper ends of the side walls, a cover pivoted to the upper end of the rear wall for vertical swinging movement from a raised position out of closing relation to the open front of the body to a lowered position disposing it between the side walls in closing relation to the front of the body with its free lower end portion extending downwardly across the front edge of the bottom and the rear wall swung downwardly to the bottom for applying pressure to contents of the body, and a handle carried by the cover and disposed adjacent the handle of the body whereby the cover may be held in its raised position and material scooped into the body through the open front thereof.

4. A device of the character described comprising a body open at its top and front and having a bottom and side walls and a rear wall disposed between the side walls and pivoted at its lower end, the walls and bottom of the body being perforated, inwardly extending abutments along rear edges of the side walls for limiting rearward swinging movement of the rear wall, the side walls having portions of reduced width extending upwardly above the rear wall to provide arms for the side walls, a handle secured between upper ends of said arms, a cover pivoted to the upper end of said rear wall for swinging movement from a raised position out of closing relation to the front of the body to a lowered position in closing relation to the front of the body and when lowered having its lower portion extending across the front edge of the bottom of the body, and an actuating member for the cover adapted to be grasped by the hand holding the handle of the body when the cover is swung upwardly and hold the cover in its raised position.

5. A device of the character described comprising a body open at its top and front and having a bottom and side walls formed of a blank of perforated material bent to provide the bottom and side walls, a rear wall of perforated material pivoted at its lower end to the rear end of said bottom, the side walls having extensions bent to form flanges along their rear edges for limiting rearward movement of the rear wall between the side walls, said side walls having their upper portions reduced in width and extending upwardly above the rear wall to provide arms, a handle extending between upper ends of said arms, a securing member extending through the arms and longitudinally through said handle, prongs carried by upper ends of the arms and embedded in ends of the handle to prevent turning of the handle about the securing member, a cover for the open portion of said body hinged to the upper end of said rear wall and when closed and shifted downwardly being adapted to swing the rear wall towards the bottom in a compressing direction, and a handle for the cover.

6. A device of the character described comprising a body open at its front and top and having a bottom and side walls formed of perforated material, a rear wall of perforated material disposed between the side walls and having its lower end hinged to the rear end of the bottom, means for limiting rearward swinging movement of the rear wall, the side walls having portions extending upwardly above the rear wall to provide arms for the side walls, a handle secured between upper ends of said arms, a cover plate of imperforate material hinged to the upper end of the rear wall, side flanges extending upwardly from side edge portions of said cover plate and provided with upwardly extending arms disposed opposite each other intermediate the length of the cover plate, and a handle secured between the arms of the cover plate and extending substantially parallel to the handle of the body whereby the two handles may be grasped with one hand and the cover plate held in a raised position and material scooped into the body.

IDA J. FEDJE.